United States Patent [19]

Brownell et al.

[11] Patent Number: 4,857,195
[45] Date of Patent: Aug. 15, 1989

[54] LIQUID FILTER WITH A DISTORTING PORTION FOR TRANSMITTING HYDRAULIC FORCES

[75] Inventors: Peter Brownell, Providence; Joseph A. Borgia, Cranston; Robert Gabrielson, Smithfield, all of R.I.

[73] Assignee: Allied-Signal Inc., Morristown, N.J.

[21] Appl. No.: 219,410

[22] Filed: Jul. 15, 1988

[51] Int. Cl.$^4$ ............................................. B01D 27/08
[52] U.S. Cl. ...................................... 210/443; 210/450; 210/DIG. 17; 210/493.1
[58] Field of Search ......... 210/440, 443, 450, DIG. 17, 210/493.1, 497.01; 55/498, 502, 521; 123/196 R, 196 A

[56] References Cited

U.S. PATENT DOCUMENTS

| | | | |
|---|---|---|---|
| 2,087,887 | 7/1937 | Gesner | 210/443 |
| 2,287,982 | 6/1942 | Frudder | 210/131 |
| 2,902,163 | 9/1959 | Humbert, Jr. | 210/440 |
| 3,289,837 | 12/1966 | Rothemund | 210/266 |
| 3,333,703 | 8/1967 | Scavuizza et al. | 210/D17 |
| 3,405,805 | 10/1968 | Hatter | 210/130 |
| 3,722,691 | 3/1973 | Francois | 210/D17 |
| 3,743,096 | 7/1973 | Harvey, Jr. et al. | 210/232 |
| 4,051,036 | 9/1977 | Conrad et al. | 210/232 |
| 4,146,475 | 3/1979 | Forsland | 210/180 |
| 4,268,384 | 5/1981 | Rosaen et al. | 210/133 |
| 4,345,946 | 10/1982 | Warlick et al. | 210/774 |
| 4,369,110 | 1/1983 | Priest | 210/180 |

FOREIGN PATENT DOCUMENTS

| | | | |
|---|---|---|---|
| 1495306 | 9/1966 | France | 210/D17 |
| 514963 | 2/1955 | Italy | 210/D17 |

Primary Examiner—Richard V. Fisher
Assistant Examiner—Wanda L. Millard
Attorney, Agent, or Firm—Ken C. Decker; William N. Antonis

[57] ABSTRACT

A liquid filter includes a housing having a pressure chamber portion in which a filtering media is carried and a support engaging portion which attaches the housing to the engine upon which the filter is mounted. The support engaging portion includes a radially projecting section which mounts the usual gasket which effects a seal between the housing and a sealing surface on the engine. The radially projecting portion cooperates with the portion of the housing containing the filter to define a circumferentially extending groove therebetween, which isolates the gasket from the distorting forces generated in the housing by hydraulic pressure.

13 Claims, 1 Drawing Sheet

U.S. Patent  Aug. 15, 1989  4,857,195
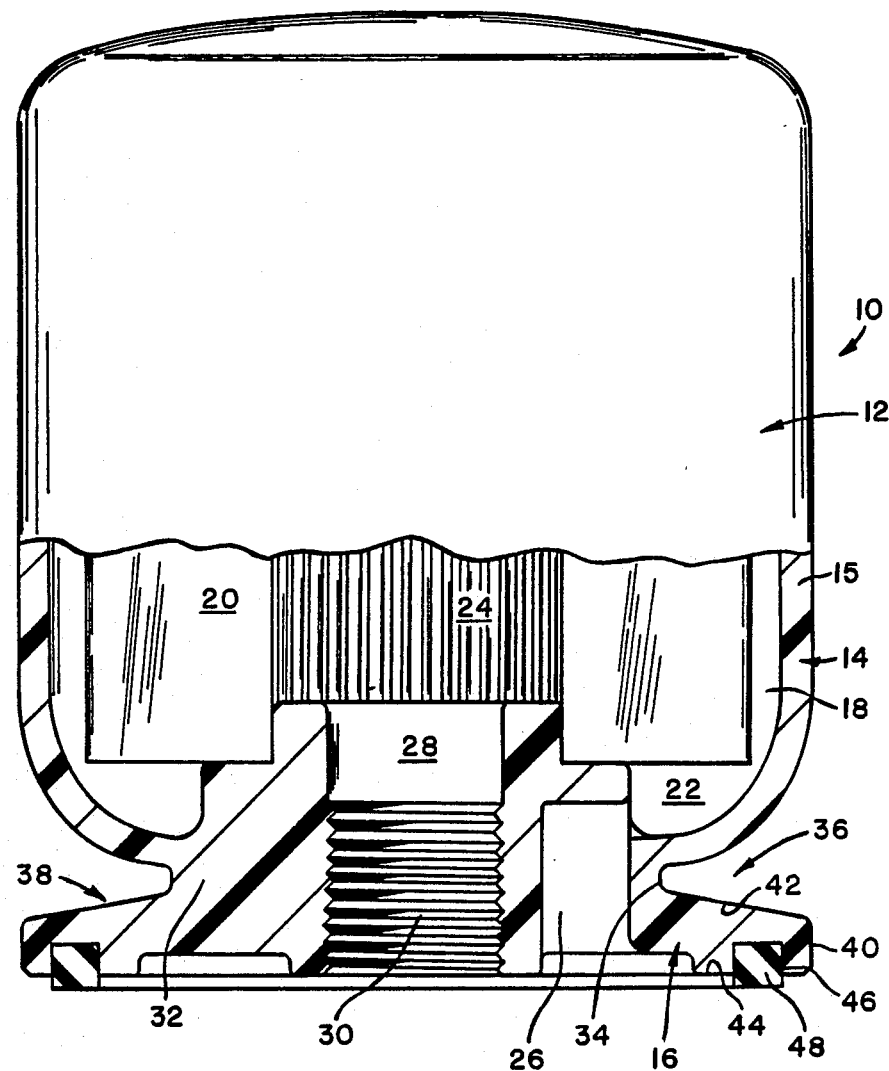

LIQUID FILTER WITH A DISTORTING PORTION FOR TRANSMITTING HYDRAULIC FORCES

This invention relates to a liquid filter for filtering, for example, the lubricating oil, fuel oil, gasoline, or coolant used in an internal combustion engine.

Liquid filters have been used for many years for filtering liquids used by internal combustion engines. These filters, particularly those used for filtering lubricating oil, are commonly of the so-called "spin-on" type, in which a filtering media is contained within a throw-away metal housing which is attached to a mounting base provided on the internal combustion engine. The housing used is traditionally made of metal in order to withstand the relatively high internal hydraulic pressures generated when the filter is used. Accordingly, these filters have an outer metal shell having an open end which receives the filtering media. The open end is closed by a tapping plate of heavier gauge metal. The tapping plate carries a mounting recess, which is attached to a mounting stud which extends from the engine upon which the filter is used. A gasket is carried by the tapping plate and circumscribes the recess. The gasket seals when engaging the mounting surface on the engine.

The housing must be relatively strong, since high hydraulic pressures generated in the housing have a tendency to distort the housing and pull the gasket away from the sealing surface on the engine, thereby causing the filter to fail. While filters made of metal are not normally subjected to pressure sufficiently high to force the seal away from the sealing surface, it is possible that this will occur if extremely high pressures are generated. More recently, it has been proposed to manufacture filter housings out of material other than metal, such as plastics. However, common plastic materials are generally more elastic than metal. Accordingly, housings made of these plastic materials have not generally been used, since they cannot economically be made strong enough to prevent distortion of the housing when the filter is pressurized.

The present invention permits manufacture of the filter housing of moldable plastic material. Use of moldable plastic permits certain economics in design and production not available in metal.

A design according to the present invention is unique in that the gasket is mounted on a portion of the housing which is isolated by a circumferentially extending groove from forces directed generally along the axis of the housing. Accordingly, a minimum of axial forces generated by pressurization of the housing by hydraulic pressure will be transferred to the gasket, so that the gasket remains in sealing engagement with the sealing surface on the engine at those peak interval hydraulic pressures that are encountered in engine operation.

These and other advantages of the present invention will become apparent from the following specification, with reference to the accompanying drawing, the sole figure of which is a fragmentary, longitudinal, cross-sectional view of a liquid filter made pursuant to the teachings of the present invention.

Referring to the drawing, a liquid filter generally indicated by the numeral 10 includes a housing 12 which has a pressure chamber portion 14 and a support engaging portion generally indicated by the numeral 16. The pressure chamber portion 14 includes a circumferentially extending wall 15 which defines a pressure chamber 18 therewithin. Filtering media 20, which may be the conventional pleated paper filtering media consisting of a circumferentially extending array of radially tapering pleats, is generally indicated at 20. The pleated paper 20 is conventional and is effective in removing contaminant particles from liquid filtrate pumped into the portion 22 of the pressure chamber 18 upstream of the filtering media 20, which thereupon passes through the media 20 into the chamber 24 located downstream of the filtering media 20.

The support engaging portion 16 includes a fluid inlet generally indicated by the numeral 26 which communicates the liquid filtrate into the chamber 22. As illustrated, the inlet 26 is a passage extending out the lower edge of the support engaging portion 16 viewing the Figure and may consist of more than one such passage 26 spaced circumferentially about the support engaging portion 16. An outlet generally indicated by the numeral 28 communicates with the outlet chamber 24 and is provided with a recessed portion including threads 30. The threads 30 are adapted to engage corresponding threads on a mounting stud (not shown) extending from the engine on which the filter 10 is to be mounted. The mounting stud is hollow and communicates with the outlet 28 to communicate the liquid filtrate back into the engine from the outlet chamber 24. It will be noted that, since the housing 12 is attached to the engine only by means of the threads 30, that the filter housing will be otherwise unrestrained from deformation by its mounting connection with the engine, thereby permitting deflection of the portion 16, as the chamber 14 is subjected to internal hydraulic pressure by the liquid filtrate.

The inlet 26 and outlet 28 extend through a necked section 32 of the support engaging portion 16 of the housing 12. The necked section defines one end 34 of a circumferentially extending groove 36 which is defined between the circumferentially extending wall 15 and a radially projecting section 38 of support engaging portion 16. The radially projecting section 38 has an outer edge defined by a circumferentially extending rim 40 which interconnects a pair of opposed surfaces 42, 44. The surface 42 cooperates with the wall 15 and the edge 34 to define the circumferentially extending recess 36. A circumferentially extending groove 46 is defined in the surface 44 and circumscribes the necked section 32 of support engaging portion 16. A circumferentially extending gasket 48 is received in the groove 46 and is adapted to sealingly engage a corresponding sealing surface (not shown) on the engine upon which the filter 10 is mounted. It will be noted that the gasket 48 prevents leakage of fluid from the inlet 26. It will also be noted that the groove 46 is located on a circumferential plane located radially outwardly from the necked portion 32.

When the filter is used, the housing 12 is threaded on the aforementioned mounting stud, and the engine is turned on, thereby causing liquid to communicate through the inlet 26 and pressurize the inlet chamber 22. Liquid in the chamber 22 communicates through the filtering media 20 into the outlet chamber 24, where it is communicated back into the engine through the outlet 28. When system pressures become elevated due to various conditions in other parts of the engine, the pressure in the pressure chamber 18 also becomes elevated. Since, as discussed heretofore, the only restraining connection between the filtering housing 12 and the engine upon which the filter 10 is mounted is by engagements of the threads 30 with the aforementioned mounting stud (not shown), the pressure chamber portion 14 of the housing 12 is unrestrained and can distort when sufficiently high hydraulic pressure levels are attained within the housing, particularly if the housing 12 is made from, as indicated in the drawings, a molded plastic which is inherently less rigid than more conventional materials such as steel. However, it will be noted that the distorting forces generated in the pressure chamber portion 14 of housing 12 will be minimally transmitted to the gasket 48, because the circumferentially extending recess 36 isolates the radially projecting portion 38 from the circumferentially extending wall 15. Since the gasket 48 is mounted on the radially projecting portion 38, the gasket 48 will be minimally subjected to the distorting forces generated by pressure levels in the pressure chamber 15. Accordingly, the gasket 48 will remain sealingly engaged with the aforementioned sealing surface (not shown) regardless of the distortion of the pressure chamber portion 14 of housing 12 caused by the aforementioned hydraulic forces in the pressure chamber 18.

We claim:

1. Liquid filter comprising a housing having a pressure chamber portion including a circumferentially extending wall defining a pressure chamber therewithin, filtering media mounted in said pressure chamber for removing contaminant particles from a liquid filtrate, and inlet and outlet means for communicating the liquid filtrate into and out of said pressure chamber, said housing including a support engaging portion extending from said pressure chamber portion and including opposed circumferentially extending surfaces, one of said surfaces cooperating with the circumferentially extending wall of the pressure chamber portion to define a circumferentially extending, radially projecting recess between said one surface and said circumferentially extending wall of said pressure chamber portion, said support engaging portion including mounting means for installing said liquid filter on a fixed support, said mounting means permitting relative deflection of said pressure chamber portion with respect to the mounting means, said recess inhibiting transfer of deflection of said pressure chamber portion with respect to said mounting means to the section of the support engaging portion separated from the pressure chamber portion by said recess.

2. Liquid filter as claimed in claim 1, wherein said support engaging portion includes a necked portion connecting the support engaging portion with the pressure chamber portion, said necked portion defining an inner edge of the radially projecting recess.

3. Liquid filter as claimed in claim 2, wherein the other of said surfaces carries a circumferentially extending gasket circumscribing said mounting means, said gasket being mounted in a circumferential plane radially outwardly from said recess.

4. Liquid filter as claimed in claim 2, wherein said surfaces are connected by a circumferentially extending rim defining a radially outer edge of said surfaces, and a gasket carried on the other of said surfaces in a circumferential plane located between said rim and the inner edge of said radially projecting recess.

5. Liquid filter as claimed in claim 4, wherein said inlet and outlet means extend through said necked portion.

6. Liquid filter as claimed in claim 4, wherein said mounting means is an opening projecting into said support engaging portion for engagement by said fixed support.

7. Liquid filter as claimed in claim 6, wherein one of said inlet and outlet means is a passage defined in at least in part by said radially projecting recess and the other of said inlet and outlet means is at least one other passage radially offset from said radially projecting recess, said passages extending through said necked portion into said pressure chamber portion.

8. Liquid filter comprising a housing having a pressure chamber portion including a circumferentially extending wall defining a pressure chamber therewithin, said pressure chamber being defined about an axis, filtering media mounted in said pressure chamber for removing contaminant particles from a liquid filtrate, inlet and outlet means for communicating the liquid filtrate into and out of said pressure chamber, said housing including a support engaging portion extending from said pressure chamber portion, said support engaging portion including a connecting section structurally supporting said pressure chamber section and a distorting force isolated section extending from said connecting section but isolated from distorting forces transmitted from said pressure chamber portion to said support engaging portion, said connecting section including mounting means for installing said liquid filter on a fixed support, said mounting means permitting relative deflection of said pressure chamber portion with respect to the mounting means, and a circumferentially extending gasket, said gasket being mounted on the distorting force isolated section of the support engaging portion whereby distorting forces generated by hydraulic forces in said pressure chamber will be minimally transmitted to said gasket, said distorting force isolated section being defined by a circumferentially extending groove separating the distorting force isolated section of said support engaging portion from the pressure chamber portion.

9. Liquid filter as claimed in claim 8, wherein said pressure chamber portion includes an end section engaged by the connecting section of the support engaging portion, said distorting force isolated section projecting radially from said connecting section and cooperating with the end section to define said groove.

10. Liquid filter as claimed in claim 9, wherein a necked portion defines the end of said groove.

11. Liquid filter as claimed in claim 9, wherein said distorting force isolated section includes a pair of opposed surfaces, one of said surfaces defining one edge of said groove, the other surface carrying said gasket.

12. Liquid filter comprising a housing having a pressure chamber portion including a circumferentially extending wall defining a pressure chamber therewithin, said pressure chamber being defined about an axis, filtering media mounted in said pressure chamber for removing contaminant particles from a liquid filtrate, inlet and outlet means for communicating the liquid filtrate into and out of said pressure chamber, said housing including a support engaging portion extending from said pressure chamber portion, said support engaging portion including a connecting section structurally supporting said pressure chamber section and a distorting force isolated section extending from said connecting section but isolated from distorting forces transmitted from said pressure chamber portion to said support engaging portion, said connecting section including mounting means for installing said liquid filter on a fixed support, said mounting means permitting relative deflection of said pressure chamber portion with respect to the mounting means, and a circumferentially extending gasket, said gasket being mounted on the distorting force isolated section of the support engaging portion whereby distorting forces generated by hydraulic forces in said pressure chamber will be minimally transmitted to said gasket, said connecting section of said support engaging portion including a necked portion connecting the support engaging portion with the pressure chamber portion, said inlet and outlet means including passages extending through said necked portion.

13. Liquid filter as claimed in claim 12, wherein said mounting means is a recess projecting into said necked portion for engagement by said fixed support.

* * * * *